Figure 1:
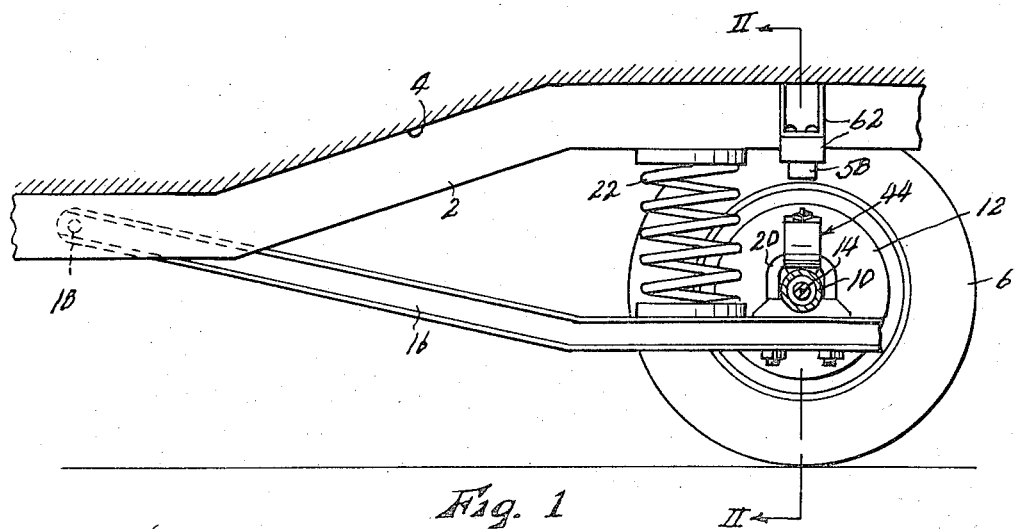

United States Patent [19]
Wright et al.

[11] 3,850,444
[45] Nov. 26, 1974

[54] OVERLOAD SPRINGS FOR AUTOMOTIVE VEHICLES

[76] Inventors: Oliver L. Wright, Box 206; Wilbur D. Wright, Box 81, both of Lincoln, Mo. 65338

[22] Filed: Feb. 21, 1973

[21] Appl. No.: 334,241

[52] U.S. Cl. ............................ 280/124 R, 267/22 A
[51] Int. Cl. ............................................ B60g 11/40
[58] Field of Search......... 280/124 R; 267/22 A, 23, 267/24, 28, 48, 51, 54, 29

[56] References Cited
UNITED STATES PATENTS
1,389,591  9/1921  Magin .................................. 267/28
2,411,852  12/1946  Domine ............................... 267/22
FOREIGN PATENTS OR APPLICATIONS
641,030  10/1930  France ............................. 267/22 A
483,227  7/1953  Italy ..................................... 267/22

Primary Examiner—Philip Goodman
Attorney, Agent, or Firm—John A. Hamilton

[57] ABSTRACT

An overload spring for automotive vehicles consisting of a cantilever spring bar fixedly mounted on a portion of the vehicle movable with a wheel thereof, and a bumper fixed to the vehicle frame so as to engage and deflect the spring when the vehicle is overloaded to some degree, and to move the free end of the spring bar into engagement with a vehicle portion movable with the wheel when the vehicle is overloaded to a still greater degree, so that the spring is converted to a beam type spring and hence further stiffened.

4 Claims, 8 Drawing Figures

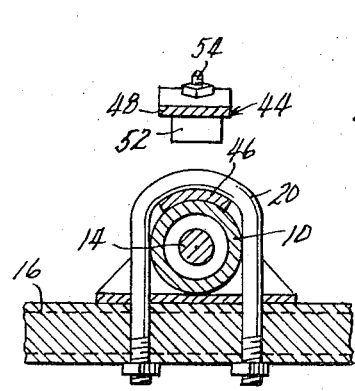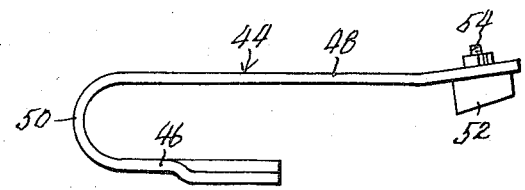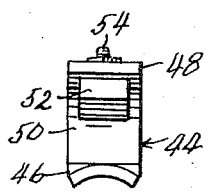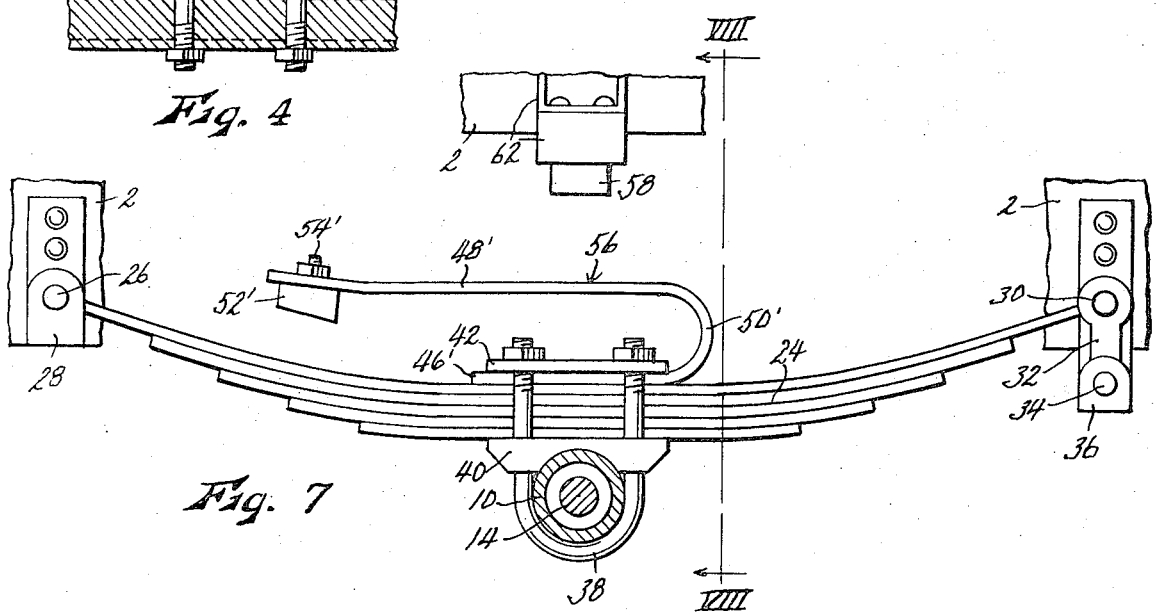

OVERLOAD SPRINGS FOR AUTOMOTIVE VEHICLES

This invention relates to new and useful improvements in overload springs for automotive vehicles.

In automotive vehicles, the wheels thereof are of course connected to the chassis of the vehicle by means of a spring suspension of one type or another, usually involving coil springs, leaf springs, torsion bars or the like, and the selection of the strength of the springs is a matter of balancing the necessary load capacity of the vehicle against the desired "softness" and comfort of riding. Suspensions designed for maximum load provide a hard uncomfortable ride, while "soft" suspensions designed for maximum comfort will not support the vehicle properly when the latter is overloaded. The problem is particularly evident in passenger cars which on occasion must carry heavy loads, or pull heavy trailers, and in certain light trucks, such as pick-up trucks. Such vehicles are desirably rather lightly sprung, for greater comfort, but sometimes are nevertheless heavily loaded to such a degree that the soft suspensions would be inadequate, and would tend to yield permanently and break down.

Various types of overload springing have been proposed, but all within our knowledge involve in one way or another the strengthening or stiffening of the usual wheel suspension system in all portions of its range of yieldability, with the result that the suspension provides a relatively hard, uncomfortable ride at all times.

Accordingly, the primary object of the present invention is the provision of an overload spring which remains totally inoperative when the vehicle is only lightly or normally loaded, so as to maintain the soft, comfortable riding characteristics of the customary suspension, but which comes into operation automatically whenever the vehicle is overloaded to a predetermined degree.

Another object is the provision of an overload spring of the character described which provides a two-step stiffening of the customary suspension, stiffening the suspension to a lesser degree when the overload is of a lesser degree, and to a greater degree when the overload is still greater. In this manner, relative softness and comfort of riding characteristics can be maintained even during the first overload range.

Generally, these objects are attained by the provision of a spring bar of U-form arranged horizontally with its lower leg affixed to a vehicle part movable with a wheel thereof, and the upper leg with its free end spaced above said vehicle part, and a bumper member fixed to the vehicle chassis and normally spaced above an intermediate point of the upper spring leg. In normal loading, said spring remains totally inoperative, since the bumper does not engage the spring. On a lesser degree of overloading, the bumper engages the upper spring leg, which yields in the manner of a cantilever spring to provide additional support for the chassis. On a still greater degree of overloading, the free end of the upper spring leg engages and is arrested by the vehicle part movable with the wheel, whereby said leg is converted to a beam type spring supported at both ends, so as to provide still greater chassis support.

Further objects are simplicity and economy of structure, efficiency and dependability of operation, and the provision of an overload spring which can be mounted as add-on equipment to nearly any pre-existing wheel suspension, and to both the front and rear wheels of a vehicle.

Figure 2:
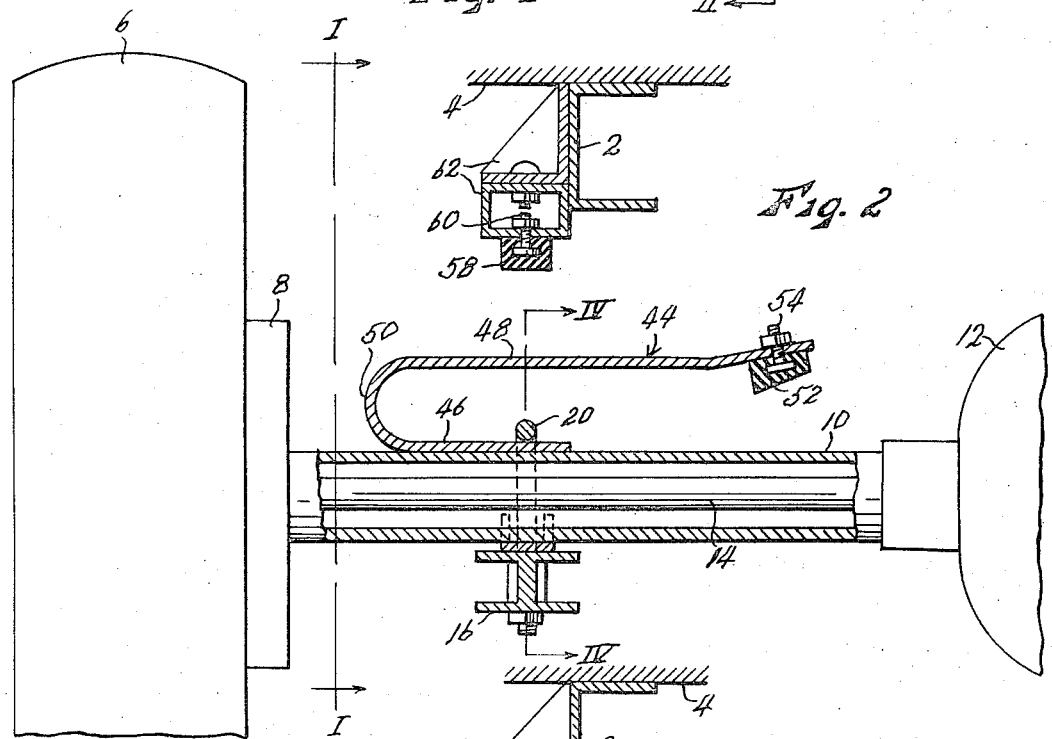
Figure 3:
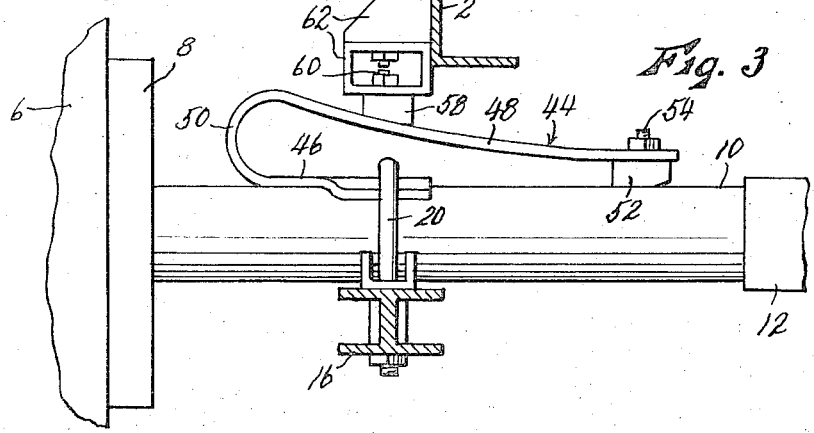

With these objects in view, as well as other objects which will appear in the course of the specification, reference will be had to the accompanying drawing, wherein:

FIG. 1 is a side elevational view of an overload spring embodying the present invention, mounted operatively on an automotive vehicle which is shown partially and fragmentarily, being a reduced sectional view taken on line I—I of FIG. 2, FIG. 2 is an enlarged, fragmentary sectional view taken on line II—II of FIG. 1, FIG. 3 is a view similar to FIG. 2, but showing the overload spring in a yielded position, and with parts left in elevation, FIG. 4 is a fragmentary sectional view taken on line IV—IV of FIG. 2, FIG. 5 is a side elevational view of the overload spring only, FIG. 6 is an end view of the spring as shown in FIG. 5, FIG. 7 is a view similar to FIG. 1, but showing the overload spring as mounted in connection with a leaf-spring wheel suspension and FIG. 8 is a fragmentary sectional view taken on line VIII—VIII of FIG. 7.

Like reference numerals apply to similar parts throughout the several views, and the numeral 2 applies to the chassis of an automotive vehicle. Said chassis has the vehicle body 4 mounted thereon, and is in turn supported by ground engaging wheels 6. The rear wheels of the vehicle are shown, and each is rotatably supported at a brake drum assembly 8 fixed on the outer end of an axle housing 10 fixed to and extending laterally outwardly from a differential housing 12, the wheel being driven by an axle 14 carried within housing 10 and in turn driven by motor-powered gearing within housing 12. All this is of course standard and well known.

Axle housing 10 supports chassis 2 through a customary spring suspension system of one type or another. In FIGS. 1–6, the suspension system includes a pair of fore-and-aft extending bars 16 (one shown) which are pivoted to chassis 2 forwardly of the wheels, as at 18, and extend rearwardly beneath axle housing 10, respectively adjacent wheels 6, each being affixed to said axle housing by a U-bolt 20, and a vertically disposed helical compression spring 22 disposed between each arm 16 and chassis 2, just forwardly of the axle housing. This is of course a highly simplified showing, leaving out many details of structure, as well as shock absorbers and the like, but the structure is common and well known in the art. FIGS. 7 and 8 show a leaf spring suspension, in which there is utilized a multiple-leaf spring 24 pivoted at its forward end, as at 26, to a bracket 28 affixed to chassis 2, pivoted at its rearward end, as at 30, to one end of a shackle 32 which is pivoted at its opposite end, as at 34, to a bracket 36 affixed to chassis 2. The midpoint of spring 24 is affixed to axle housing 10 by a pair of U-bolts 38, said U-bolts being disposed respectively at opposite sides of the spring, and passing through a cradle member 40 disposed between the spring and the axle housing, and a clamp plate 42 above the spring. In both types of suspensions, the chassis is disposed well above the axle housing, to permit vertical movement of the latter as the springs yield.

Referring first to FIGS. 1–6, the overload spring contemplated by the present invention is indicated generally by the numeral 44. It comprises a flat bar of spring steel formed in generally U-shape as shown, arranged generally parallel to the axle housing, thereabove, and opening away from the associated wheel 6, and toward differential housing 12. It includes a lower leg 46 and an upper leg 48 which is parallel to and spaced above leg 46, said legs being connected by a semi-circularly curved portion 50. Lower leg 46 is the shorter and lies against axle housing 10, a portion thereof being formed in a downwardly concave curvature to fit the axle housing accurately, and is rigidly affixed to said axle housing by insertion thereof between U-bolt 20 and the axle housing. Upper leg 48 of the spring is spaced well above the axle housing, and has a firm rubber bumper 52 affixed to the lower surface thereof, adjacent its free end, by means of a bolt 54 embedded therein. Said bumper also is normally disposed in spaced relation above the axle housing, as shown in FIG. 2.

FIGS. 7 and 8 show an overload spring, designated generally by the numeral 56, for use with leaf-spring suspensions. Spring 56 is identical in nearly all respects to spring 44, corresponding parts being indicated by corresponding primed numerals, except that lower leg 46' thereof may be left flat and is clamped rigidly between clamp plate 42 and spring 24, and except that in this case the overload spring extends generally fore-and-aft of the vehicle, with bumper 52' thereof normally disposed in spaced relation above a portion of spring 24 remote from the axle housing.

With either arrangement of the overload spring, the overload spring assembly also includes a firm rubber bumper 58 disposed in normally spaced apart relation above an intermediate point of top leg 48 or 48' of the overload spring, and affixed by a bolt 60 to a bracket 62 affixed to chassis 2.

In operation, it will be seen that so long as the vehicle body 4 is only lightly or normally loaded, the overload springs are completely inoperative, since bumpers 58 do not engage the upper legs 48 of the overload springs, but remain spaced thereabove, so that the spring support of the vehicle body is derived solely from the suspension springs 22 or 24, as the case may be. The suspension springs may be sufficiently soft to provide comfortable riding characteristics.

If the vehicle is overloaded to a certain degree, suspension springs 22 or 24 will yield sufficiently to allow bumpers 58 to engage upper legs 48 of the overload springs, so that any further settling of the chassis forces the overload springs to yield, and hence to provide stiffer, harder support for the chassis. At this degree of overload, bumpers 52 of the overload springs themselves have not yet engaged axle housing 10, or suspension spring 24 as the case may be, so that spring legs 48 are acting as resilient cantilevers. This is the first step of the "two-step" action of the overload springs.

When the vehicle is overloaded to a still greater degree, bumpers 52 engage axle housing 10, or spring 24 as the case may be, so that any further settling of the chassis forces spring legs 48 to bow downwardly, as shown in FIG. 3. Spring legs 48 are then functioning as beam-type springs, supported at both ends, and hence have a still greater resistance to flexure, and supply a still stiffer support for the vehicle chassis. This is the second step of the two-step action.

Nevertheless, the two-step action does not produce objectionable steps or "bumps" in the spring action, as for example when a lightly loaded vehicle strikes a severe bump in the roadway so as to initiate both steps of the two-step action. Spring leg 48 is completely relaxed when first engaged by bumper 58 to initiate the first step, and the portion of said leg between the two bumpers is completely relaxed when bumper 52 engages the axle housing (or spring 24) to initiate the second step. Thus the portion of the overload spring affected by each step is initially easily yieldable, although its resistance builds rapidly, and this effectively eliminates any objectionable "shock" action as the steps are initiated.

It will be apparent that an overload spring system having several advantages has been produced. It permits the use of soft suspension springs for greater comfort, but applies overload protection when needed. By applying overload resistance in graded steps, it provides a maximum comfort at each degree of overloading. It can be readily applied as accessory equipment to pre-existing vehicles. It can be applied to any or all wheels of a vehicle, front or rear. The adaptation shown in FIGS. 7 and 8 is best adapted for use with front wheels, both because front wheel suspensions most commonly utilize the leaf spring suspensions shown, and also because many front wheel suspensions do not include a member which could serve as a wheel-based support for bumper 52 in the manner that axle housing 10 provides such support in FIGS. 1–6. It can also be used with other types of wheel suspensions, such as the torsion bar types.

While we have shown and described certain specific embodiments of our invention, it will be readily apparent that many minor changes of structure and operation could be made without departing from the spirit of the invention.

What we claim as new and desire to protect by Letters Patent is:

1. An overload spring device for use with an automotive vehicle in which the chassis is supported above the wheels thereof by vertically yieldable suspension springs, said device comprising:
   a. a normally relaxed overload spring mounted on a base consisting of a portion of said vehicle vertically movable with the wheels thereof, and including a resilient leg supported at one end above said base in the manner of a cantilever,
   b. a bumper member mounted on the vehicle chassis and operable, whenever said suspension springs have yielded to a predetermined degree, to engage said spring leg intermediate its ends and to deflect it downwardly, and
   c. an abutment member mounted at the free end of said spring leg, said abutment member normally being spaced above said base but engaging said base when said spring leg is deflected downwardly to a predetermined degree, whereafter said spring leg constitutes a beam supported at both ends.

2. The structure as recited in claim 1 wherein said overload spring is of U-shape with generally horizontal upper and lower legs, said lower leg being affixed to said base and said upper leg being spaced above said base, said bumper member being positioned to engage said upper leg intermediate the ends thereof, and said abutment member being affixed to the free end of said upper leg.

3. The structure as recited in claim 2 wherein said base constitutes the rear axle housing of said vehicle, the U-form of said overload spring extending parallel to said housing.

4. The structure as recited in claim 2 wherein said base constitutes a leaf-type spring which constitutes one of said suspension springs and which extends fore-and-aft of the vehicle, the U-form of said overload spring extending parallel to said leaf spring.

* * * * *